July 17, 1956 W. H. WILKINSON 2,755,063
ROTOR CONSTRUCTIONS FOR GAS-TURBINE ENGINES
Filed Nov. 8, 1951 4 Sheets-Sheet 1
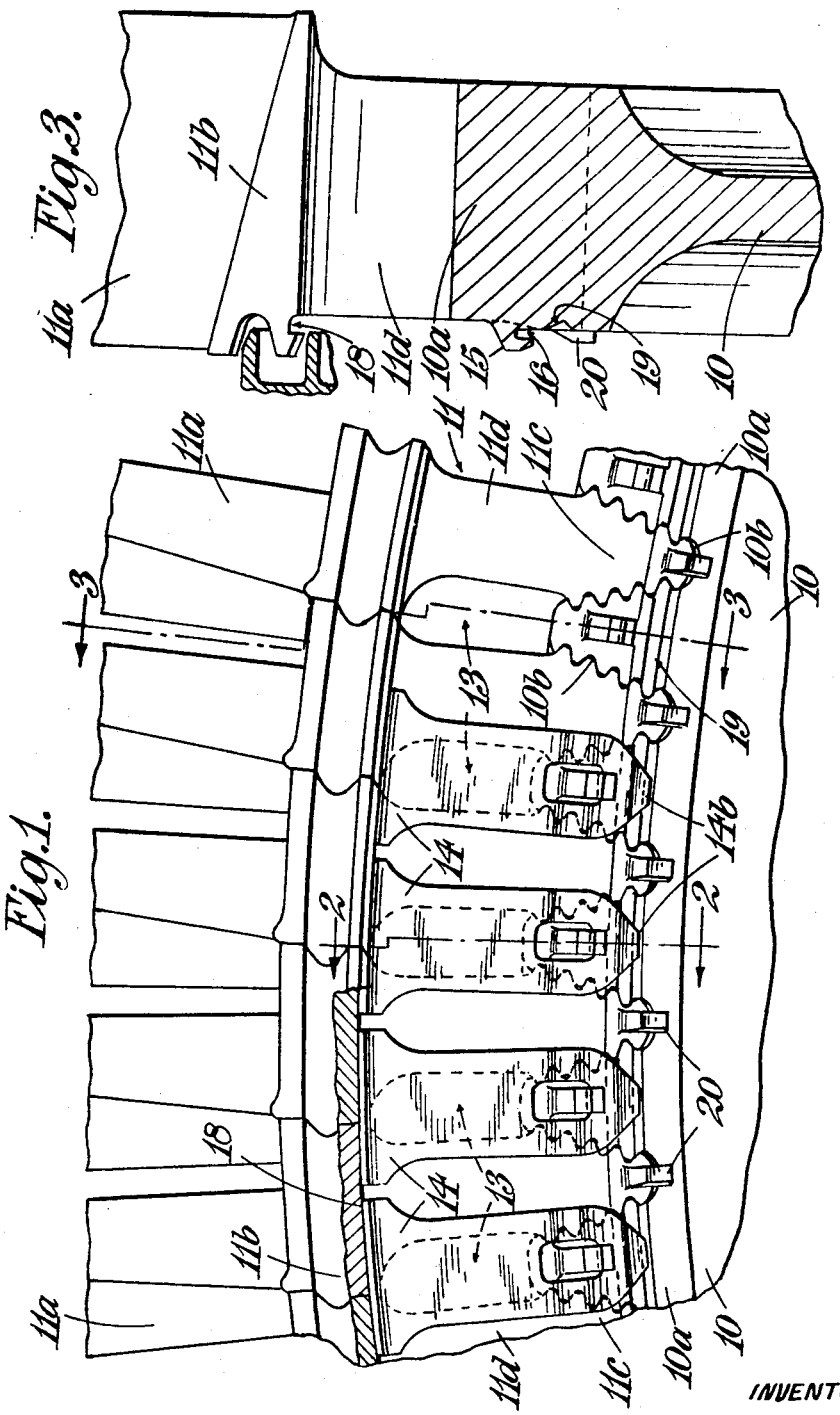
INVENTOR
W. H. WILKINSON
By Wilkinson & Mawhinney
ATTYS.

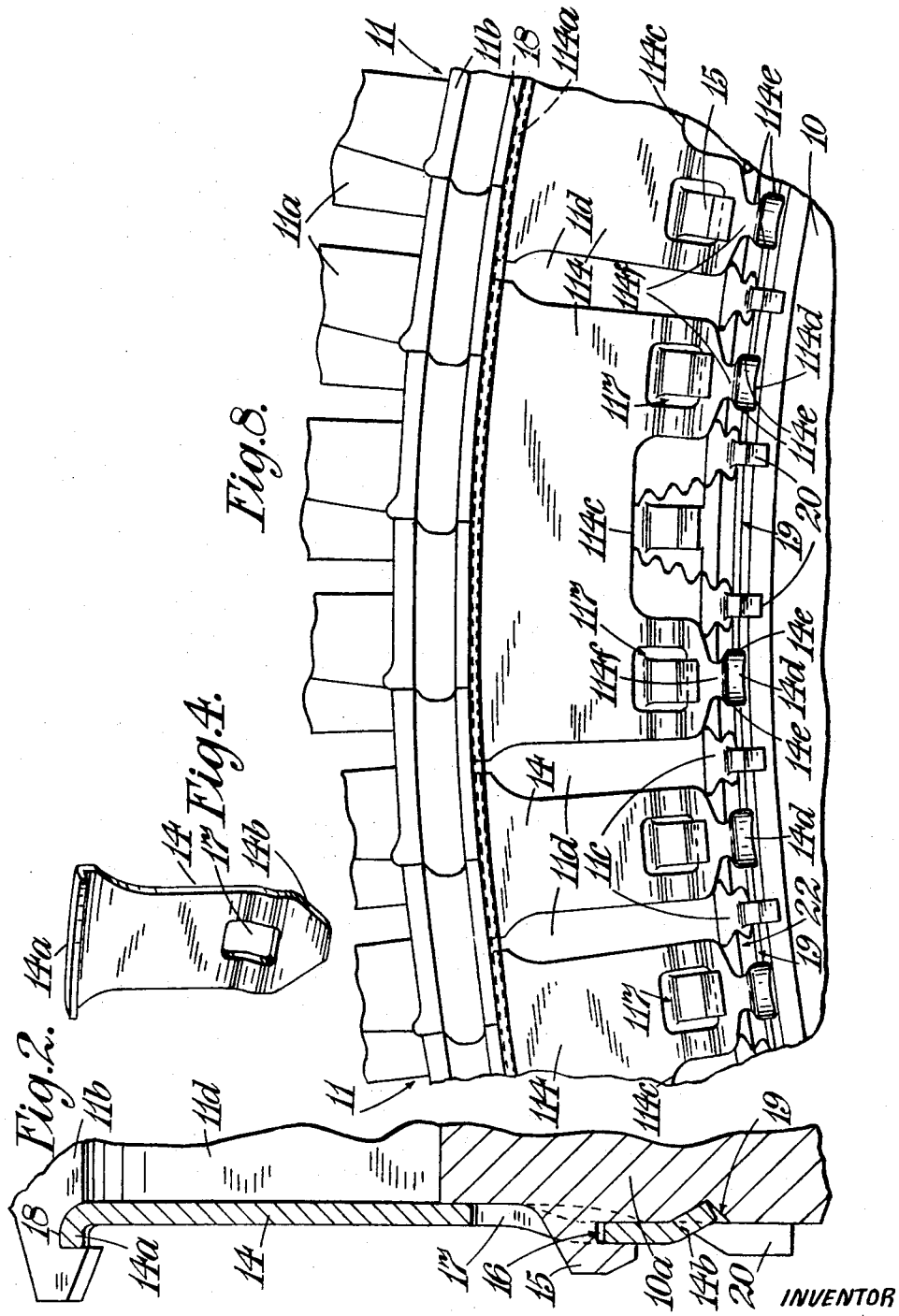

July 17, 1956 — W. H. WILKINSON — 2,755,063
ROTOR CONSTRUCTIONS FOR GAS-TURBINE ENGINES
Filed Nov. 8, 1951
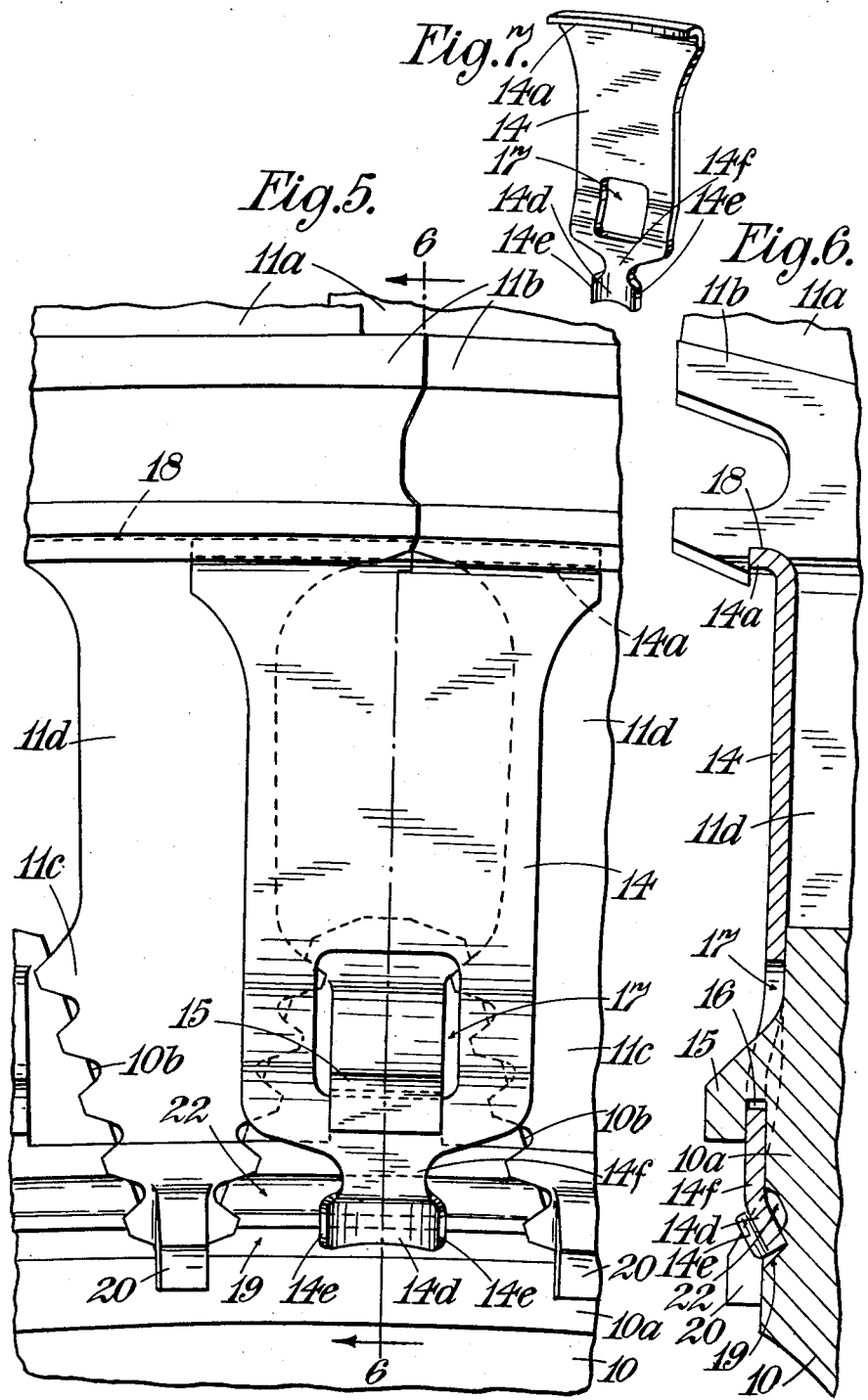

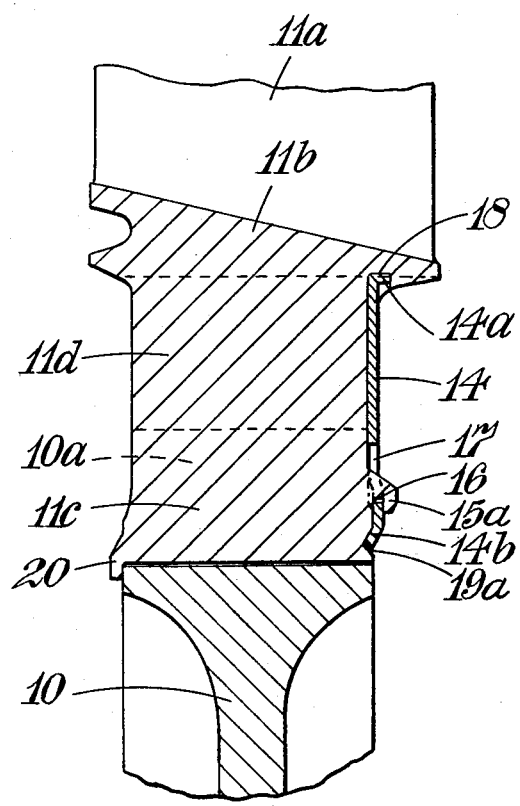

United States Patent Office 2,755,063
Patented July 17, 1956

2,755,063

ROTOR CONSTRUCTIONS FOR GAS-TURBINE ENGINES

Wilfred Henry Wilkinson, Turnditch, England, assignor to Rolls-Royce Limited, Derby, England, a British company Application November 8, 1951, Serial No. 255,359

Claims priority, application Great Britain November 14, 1950

3 Claims. (Cl. 253—77)

This invention relates to gas-turbine engines and is concerned more especially with rotors for such engines.

According to the present invention, a rotor for a gas-turbine engine comprises a rotor disc, a plurality of blade elements each having a root portion by which the blade element is mounted on the rim of the disc, and a plurality of plate elements mounted on and disposed in circumferentially-spaced relation around the periphery of the rotor to co-operate with an axially-directed surface of the disc rim or of root-portions of the blade elements, or both.

One important application of the invention is in turbine rotors, whereof each root portion of a blade element comprises an attachment portion by which the blade element is connected with the disc rim, a platform portion which with the platform portions of other root portions forms a wall of a working fluid annulus, and an elongated stem interconnecting the attachment portion and the platform portion. When employed with such a turbine rotor, the plate members may be located to lie against one or both of the axially-facing surfaces, but preferably against the high-pressure surface of the disc rim and root portions to blank off the spaces between adjacent stems thereby to prevent the flow of hot gas from the high-pressure side of the disc to the low-pressure side through these spaces.

In another application, the plate elements may be employed for preventing blade elements from becoming detached from a disc. For instance, if the root portions of the blade elements have, say, "fir-tree" type attachment portions which interlock with shaped slots extending across the disc rim and the attachment portions have tangs to prevent displacement of the blade elements in one direction in the slots, then the plate elements may be mounted on the axially-directed surface of the disc rim which is engaged by the tang and engage, or bear against, or interlock with the adjacent axially-directed surfaces of the root portions to prevent their displacement in the opposite direction, or the plate elements may be mounted on the axially-directed surfaces of the root portions remote from the tangs and engage, or bear against, or interlock with the disc rim.

In another application, the plate elements may be employed for damping vibrations of blade elements by being mounted on the rim of the rotor in a manner, for instance with radial freedom, to apply centrifugally a load on a pair of adjacent blade elements, for instance by engaging shroud-forming platform parts of the root portions of the blade elements.

In yet another application, the plate elements may be employed for rotor balancing purposes. In this case, the plate elements may be machined pieces with a range of weights obtained by leaving varying amounts of metal in a suitable position when machining the plate elements. Thus any necessary adjustment to the balance of the rotor may be made by varying the weights of some of the plate elements.

Clearly the plate elements may be arranged to fulfill simultaneously two or more of the above purposes.

According to a feature of this invention, a plate element may be located by having an edge of a hole in it engaged in an undercut channel in a lug projecting axially from the rotor whereby the plate element is held with radial freedom against the axially-directed surface of the rim or associated root portions, and by having its radially inner and/or outer parts engaging slots or grooves to restrain the plate element against radial movement. For instance, the outer edges of the plate elements may be turned-over to provide a narrow axially-directed flange and entered in grooves cut in inwardly-facing surfaces of the associated blade elements, and the inner part of the plate elements may be bent, after the plate elements have been properly positioned, to enter an axially-facing groove in the rim surface thereby to prevent radially inward movement of the plate element.

Some constructions of turbine rotor embodying the invention will now be described reference being made in the description to the accompanying drawings, in which—

Figure 1 is a view looking on the high-pressure side axially-facing surface of a part of a turbine rotor, Figure 2 is a section on the line 2—2 of Figure 1 but on a larger scale, Figure 3 is a section on the line 3—3 of Figure 1, Figure 4 is a perspective view of a plate element such as is used in the construction of Figures 1 to 3, Figure 5 is a view to a larger scale corresponding to part of Figure 1 and illustrating a modification, Figure 6 is a section on the line 6—6 of Figure 5

Figure 7 is a perspective view of the plate element employed in the construction of Figures 5 and 6, Figure 8 is a view corresponding to Figure 1 of another construction, and Figure 9 illustrates in axial view a modified arrangement of this invention.

Referring to Figures 1 to 4, the turbine rotor, part only of which is illustrated, comprises a disc 10 the rim 10a of which is thickened and slotted from its front face to its rear face to provide shouldered slots 10b each of which receives the attachment means of a blade of a ring of blades 11 carried on the rim of the disc 10 to extend outwards therefrom.

Each blade 11 comprises a vane 11a of suitable aerodynamic section extending outwardly from a root and the root comprises a platform portion 11b which together with the platform portions 11b of other blade elements 11 forms an annular surface of the working fluid passage of the turbine, a "fir-tree" attachment portion 11c which is received in one of the slots and a stem 11d joining the platform portion 11b to the attachment portion 11c.

The stem 11d of the blade elements 11 have a substantially less circumferential dimension that the corresponding dimension of the platform portions 11b so that, when the blades 11 are mounted on the rim 10a of the disc 10, spaces 13 are left between adjacent stems 11d, which spaces extend from the front axially-facing surface of the rim 10a of the disc, that is the surface on the high-pressure side of the rim, to the rear axially-facing surface of the rim 10a.

It is desirable to blank off these spaces 13 so as to prevent the flow of hot gas from the high-pressure side of the disc 10 to the low-pressure side thereof, and for this purpose in this embodiment of the invention there are provided a plurality of plate elements 14 the primary function of which is to blank off these spaces at one end. The plate elements 14 also serve to prevent axial displacement of the blades 11 in one direction.

Each plate element 14 is formed from sheet metal and has a dimension in one direction somewhat greater than the length of the stems 11d and a dimension at right angles thereto sufficient to enable the plate element 14 to overlap portions of the axially-directed surfaces of a pair of adjacent stems 11d. The outer edges of the plate elements are turned-over to afford a narrow axially-directed flange 14a, and the upstream edge of the platform portions 11b of the pair of blade elements 11 associated with the plate element 14 are undercut with channels 18 to receive this narrow flange 14a.

The circumferentially-spaced edges of each plate element 14 are parallel at their radially outer ends and converge at their radially inner ends so that the radially inner edge of the plate element 14 is somewhat narrower than the outer edge.

Each plate element 14 is mounted on the front axially-directed surface of the disc rim in the following manner:

Each plate element 14 is formed with a hole 17 and the disc rim is formed with an axially-directed lug 15 projecting from the disc rim between each pair of slots 10b, which lug has an undercut channel 16. (When as is usual the fir-tree slots 10b of the disc are inclined to the axis of the disc, it may be necessary to offset the lug 15 slightly from the radial centre-line of the axially-directed surface of the land on which it is formed, in order to avoid interference by the slot-forming tool on the side of the lug.) The plate element 14 is presented to the front face of the disc rim 10a so that the lug 15 passes through the hole 17 and so that the plate element lies against the front surface of the rim 10a of the disc and against a pair of blade stems 11d. The plate element 14 is then pushed radially outwards so that the narrow flange 14a at its outer end engages in the channels 18 in the associated blade platforms 11b and the part of the plate element forming the bottom edge of the hole 17 enters the undercut channel 16 in the lug 15. The plate element 14 is thus restrained against radially outward movement and is held against the axially-directed surfaces of the blade rim 10a and the stems 11d of the associated blade roots. It will thus be seen that each blade element blanks off the space 13 between the stems 11d against which it is held.

The radially inner end 14b of the plate element 14 is then bent backwardly into an axially-facing groove 19 cut in the land thereby to restrain the plate element against radially inward movement.

In this construction, the plate element 14 also acts to prevent displacement of the blades 11 in their slots 10b in a direction towards the front face of the disc 10. Displacement of the blades 11 in the opposite direction is prevented by overhanging tangs 20 on the fir tree attachment portions 11c which bear against the front surfaces of the rim 10a.

If, as shown in Figure 9, the plate elements 14 are provided in contact with the rear face of the disc rim 10a instead of the front face as above described, undercut lugs 15a corresponding to the lugs 15 may be formed on the "fir tree" attachment portions 11c of the blades instead of on the disc rim 10a so that the plate elements 14 prevent axial displacement of the blades to the right by overlapping the parts of the rim 10a between the slots 10b of the disc 10, the lugs 20 prevents axial displacement to the left. Also, instead of grooves 19 in the disc rim, the inner ends 14b of the plates 14 engage grooves 19a in the portions 11c of the blades.

When it is desired to remove a plate element 14, the inner end 14b may be cut off, for example by a machining operation, and the plate element then disengaged from the channels 16, 18.

Referring now to Figures 5 to 7, in which the same references are used as in Figures 1 to 4 to indicate unaltered parts, there is illustrated a form of the plate elements 14 the use of which simplifies detachment of the plate element from the rotor. In this arrangement the radially inner end of the plate element is formed as a depending tab 14d the lateral edges of which are formed as outstanding lugs 14e. The lugs 14e enable the tab 14d to be gripped or levered for withdrawal from the groove 19. The tab 14d is connected to the main portion of the plate element 14 by a narrow neck 14f, and the disc rim 10a may have a deep channel 22 adjacent the neck 14f to facilitate the insertion of a tool to lever the tab 14d outwards from groove 19.

Referring now to Figure 8, there is illustrated yet another form of plate element. The plate element 114 is arranged to extend circumferentially to co-operate with the stems 11d of a group of more than two blade elements 11, say four blade elements, and has a pair of holes 117 spaced apart to fit respectively over the lug 15 which projects from rim 10a between the slots 10b for the end pair of attachment portions 11c at one end of the group of blades and over the lug 15 which projects from the rim 10a between the slots 10b for the end pair of attachment portions 11c at the other end of the group of blades 11. The plate element 114 is cut away, as indicated at 114c, to clear the remaining lug or lugs 15 associated with the group of blades but not to expose the spaces between the blade stems 11d.

The plate element 114 has an axially-directed flange 114a corresponding to the flange 14a and engaged in the channels 18, and is illustrated as having below each hole 117 a tab 114d with lugs 114e and necked portion 114f, corresponding to the parts 14d, 14e, 14f of Figures 5 to 7, to co-operate with the grooves 19, 22 in the disc rim.

The plate elements 114 may be used in association with other forms of plate element, for instance with plate elements 14 as previously described. Thus for instance all the plate elements, except say four, may be plate elements 114 and the remaining four plate elements may be plate elements 14. With such an arrangement the plate elements 114 may be in four sets separated by the four plate elements 14.

The holes 117 in a plate element 114 may be so spaced that say one lateral edge of each hole bears on the lateral surface of the associated lug 15 thereby to prevent circumferential displacement of the plate element 114.

I claim:

1. A rotor for a gas turbine engine comprising a rotor disc, a plurality of axially-extending lugs on said rotor disc, an undercut channel on the radially inner side of each lug, an axially-facing groove on said rotor disc, a plurality of blade elements each having a root portion by which the blade element is mounted on the rim of the rotor disc and a platform portion, an undercut channel on the radially inner side of each platform portion, a plurality of plate elements mounted on and disposed in circumferentially-spaced relation around the periphery of the rotor disc to lie against one face of the rotor disc and to overlap at least two adjacent blades radially inwardly of the platform portion, there being a hole in each of said plate elements of which an edge engages in the undercut channel in a corresponding one of said axially-extending lugs by radially outward movement of said element, a radially outer portion of each of said plate elements which engages in the channels of the platform portions of said adjacent blades by the same movement, and a radially inner portion of each of said plate elements bent into said axially-facing groove.

2. A rotor for a gas-turbine engine comprising a rotor disc and a ring of rotor blades mounted on the periphery of the disc, each said blade having a vane portion and a root portion including an attachment portion received in a corresponding channel extending across the disc periphery and a platform portion from which the vane portion extends and a stem joining the attachment portion to the platform portion, the platform portions together forming an inner shroud for the vane portions and the stems being circumferentially narrower than the platform portions to leave spaces between the stems which open at their ends adjacent the axially-facing surfaces of the rotor disc, a plurality of plate elements, each arranged to co-operate in abutment with the disc periphery and at least the root portions of a pair of adjacent blades to blank off an end of the space between said pair of root portions, and means to retain the plate elements in position including radially-undercut axial projections on said disc and on said root portions engaging by their undercut parts with edges of the plate elements thereby to locate the plate elements against axial displacement and against radially outward displacement, and lugs on said plate elements engaging a circumferential axially-facing channel in said rotor disc to locate said plate elements against radial displacement.

3. A rotor for a gas-turbine engine comprising a rotor disc having an axially-facing groove, a plurality of blade elements each having a root portion by which the blade element is mounted on the rim of the rotor disc and a platform portion, there being an undercut channel on the radially inner side of each platform portion, a plurality of circumferentially-spaced lugs extending axially from a surface of said rotor, there being an undercut channel on the radially inner side of each lug, a plurality of plate elements mounted on and disposed in circumferentially-spaced relation around the rotor to lie against one face of the rotor disc radially inwardly of the platform portions of the said blade elements, each of said plate elements having a hole therein of which an edge is engaged in said undercut channel in said axially-extending lug, and each of said plate elements having a radially-outer portion which is engaged in the channel of one at least of the platform portions, and a radially inner portion of each of said plate elements being engaged in said axially-facing groove.

References Cited in the file of this patent

UNITED STATES PATENTS

| | | |
|---|---|---|
| 2,494,658 | Highberg et al. | Jan. 17, 1950 |
| 2,595,829 | Dean | May 6, 1952 |

FOREIGN PATENTS

| | | |
|---|---|---|
| 595,643 | Great Britain | Dec. 11, 1947 |
| 612,097 | Great Britain | Nov. 8, 1948 |